US006935157B2

(12) United States Patent
Miller

(10) Patent No.: US 6,935,157 B2
(45) Date of Patent: Aug. 30, 2005

(54) ANTI-BOB SYSTEM FOR CYCLES

(76) Inventor: Larry D. Miller, 4030 Oak Tree Cir., Rochester, MI (US) 48306

( * ) Notice: Subject to any disclaimer, the term of this patent is extended or adjusted under 35 U.S.C. 154(b) by 0 days.

(21) Appl. No.: 10/624,146

(22) Filed: Jul. 21, 2003

(65) Prior Publication Data

US 2004/0069073 A1 Apr. 15, 2004

Related U.S. Application Data

(60) Provisional application No. 60/417,882, filed on Oct. 11, 2002.

(51) Int. Cl.[7] .................................................. G01M 7/00

(52) U.S. Cl. .................... 73/12.01; 73/11.01; 73/11.04; 73/11.05

(58) Field of Search .................. 73/12.01, 11.04–11.05; 267/113, 136; 280/208–238

(56) References Cited

U.S. PATENT DOCUMENTS

| | | | | | |
|---|---|---|---|---|---|
| 4,599,079 | A | | 7/1986 | Chappell | 474/80 |
| 4,997,197 | A | * | 3/1991 | Shultz | 280/275 |
| 5,027,303 | A | | 6/1991 | Witte | 364/511 |
| 5,354,085 | A | | 10/1994 | Gally | 280/285 |
| 5,758,735 | A | | 6/1998 | MacCready, Jr. et al. | 180/206 |
| 5,829,733 | A | * | 11/1998 | Becker | 248/631 |
| 5,857,691 | A | * | 1/1999 | Fan | 280/283 |
| 5,909,890 | A | | 6/1999 | Sachs et al. | 280/284 |
| 6,029,990 | A | * | 2/2000 | Busby | 280/261 |
| 6,050,583 | A | | 4/2000 | Bohn | 280/283 |
| 6,076,845 | A | | 6/2000 | Lawwill et al. | 280/284 |
| 6,099,010 | A | | 8/2000 | Busby | 280/284 |
| 6,102,421 | A | | 8/2000 | Lawwill et al. | 280/284 |
| 6,149,174 | A | | 11/2000 | Bohn | 280/283 |
| 6,206,396 | B1 | * | 3/2001 | Smith | 280/283 |
| 6,213,236 | B1 | | 4/2001 | Yokoyama | 180/206 |
| 6,217,049 | B1 | | 4/2001 | Becker | 280/276 |

OTHER PUBLICATIONS

"Winning the War Against Bob" *Mountain Bike Action*, Oct. 2002, pps. 52–55, 58–60, 62.

* cited by examiner

*Primary Examiner*—Max Noori
*Assistant Examiner*—Alandra Ellington
(74) *Attorney, Agent, or Firm*—Gifford, Krass, Groh, Sprinkle, Anderson & Citkowski, P.C.

(57) ABSTRACT

A control system is operable to selectably activate shock damping devices associated with a bicycle so as to eliminate bobbing encountered under extreme pedaling conditions. The system includes a crank axle torque detector which operates to detect a level of torque applied to a crank axle and provide a control signal corresponding to the level of torque. A shock damping device is coupled to the frame of the cycle, and functions to absorb and dampen mechanical shocks communicated to the frame. The shock damping device includes an activator for controlling its damping function. The activator is operable to receive the control signal from the crank axle torque detector and control the shock damping device in response thereto. The control signal may be an electrical or a mechanical signal.

26 Claims, 4 Drawing Sheets

10 16 18 12 14 20 30

48
50
59
56
38
44
58
30
56a
52
40
42
54
32
34
36

48
56
54
58
60
64
62
66
68
32

48
50
56
52
58
44
38
72
70
32
54

12
88a
88b
82b
36b
80
82a
36a
16
84
86b
86a

ANTI-BOB SYSTEM FOR CYCLES

RELATED APPLICATION

This patent application claims priority of provisional patent application Ser. No. 60/417,882 filed Oct. 11, 2002, and entitled "Anti-Bob System for Cycles."

FIELD OF THE INVENTION

This invention relates generally to bicycles and the like. More particularly, the invention relates to pedal-powered cycles. Most specifically, the invention relates to a system for selectively controlling shock damping devices associated with pedal-powered cycles.

BACKGROUND OF THE INVENTION

Cycles, which term is understood to include bicycles, tricycles, unicycles and other pedal-powered devices, may include shock damping devices such as shock absorbers for absorbing road shocks which would otherwise be communicated to the cycle frame. Mountain bikes and other such off-road cycles are often operated under extreme conditions in which severe road shocks are encountered. In order to maximize a rider's comfort and minimize dangers of damage to the frame of the cycle, shock damping devices are frequently incorporated into the frame of the cycle. These shock damping devices generally operate on a combination of hydraulic (including pneumatic) and spring action. These devices are frequently included in the front fork of the cycle as well as in association with the rear wheel.

While shock damping devices can function efficiently to absorb road shocks, the inherent flexibility which they provide to the frame of the cycle is at times undesirable. This flexibility presents a particular problem when a rider exerts a high degree of torque on the pedal cranks. In such instance, the flexibility of the shock dampers causes the suspension to move, producing an action referred to in the sport as "bobbing." Bobbing is particularly notable when the cycle is being ridden under extreme conditions such as those encountered in off-road racing and other competitive events. Bobbing results in wasted energy on the part of the rider, since a portion of the rider's energy input is nonproductively absorbed by the shock damping devices.

While the inclusion of shock damping devices in cycle constructions is desirable, there is a real need to eliminate the bobbing effect produced thereby. In this regard, the prior art has implemented a number of solutions toward controlling bobbing. One approach involves the use of selectively activatable damping devices. These devices are generally controlled by a user operated lever positioned on the handlebars of the cycle. This lever allows a user to lock out the damping device when it is desirable to eliminate bobbing. The problem with devices of this type is that they require constant user input, and do not respond quickly enough to maximize shock damping while minimizing bobbing. Other control systems employ inertial devices or mechanical linkages to control the action of a damping device. These approaches are expensive, and are very difficult to implement since they require precisely machined parts and/or specially dedicated frames. In addition, devices of this type are very difficult to maintain, and must generally be tuned for each rider's weight and pedaling characteristics. Such devices are shown in U.S. Pat. Nos. 5,354,085; 6,217,049 and 6,076,845 among others.

There is a need for a control system for selectively activating the shock damping devices of a cycle, which system is simple to implement and maintain. The system should not require any extensive modification of a cycle frame, and it should be capable of being readily adapted to a variety of riders and riding conditions. As will be explained in detail hereinbelow, the present invention provides a system of this type.

BRIEF DESCRIPTION OF THE INVENTION

There is disclosed herein an anti-bob system operable to control a shock damping device of a cycle. The system includes a crank axle torque detector which operates to detect a level of torque which is applied to a crank axle of the cycle, and which is further operable to provide a control signal corresponding to the detected level of torque. The system further includes a shock damping device which is coupled to a frame of the cycle. The shock damping device functions to absorb and dampen mechanical shocks communicated to the frame, and includes an activator for controlling its damping function. The activator operates to receive the control signal from the crank axle torque detector and to control the shock damping device in response thereto. In this manner, the shock damping device is controlled in response to the level of torque applied to the crank axle.

The control signal produced by the shock damping device may be a mechanical signal such as a signal corresponding to the displacement of a control cable or to a change in pressure of a hydraulic fluid. In other instances, the control signal may be an electrical signal such as a signal produced by compression of a piezoelectric device, or by a change in electrical resistivity. The control signal may correspond to a periodically varying level of torque, and may for example correspond to a peak or average value of the varying torque level.

The torque detector may include a positionally displaceable bearing assembly which is supported upon the frame of the cycle and which has the crank axle of the cycle rotatably supported thereupon. In this system, a biasing member is disposed so as to impose a biasing force on the bearing assembly which urges the bearing assembly in a first direction relative to the frame. When a torque is applied to the crank axle, the torque operates to counter at least a portion of the biasing force so as to displace the bearing assembly in a second direction different from the first direction, and this displacement comprises or provides the control signal. In one embodiment of this version of the invention, the bearing assembly is supported upon the frame by a swing arm which is pivotally attached to the frame. In another embodiment, the bearing assembly is supported upon the frame by a housing which allows the bearing assembly to slide in the first direction and the second direction.

In other embodiments of the invention, the torque detector comprises a pressure responsive device interposed between the pedal of the cycle and a foot of a user who is operating the cycle. The pressure responsive device may be associated with the pedal of the cycle or with the foot of the user.

DETAILED DESCRIPTION OF THE INVENTION

The present invention comprises an anti-bob system for controlling the shock absorbing devices of a cycle such as a mountain bike. The system includes a simple torque detector which is operable to detect the level of torque applied to the crank axle which drives the cycle. In one embodiment, the detector is directly associated with the crank set, while in other embodiments it may be a pressure responsive device interposed between a user's foot and a pedal of the crank set. The detector produces a control signal, which can be a mechanical signal or an electrical signal. This signal is indicative of the crank axle torque, which occurs when a rider imposes a force on the pedals. This control signal is communicated to, and controls, the activation of a shock damping device. The shock damping devices used in the present invention are controllable shock damping devices as are known in the prior art.

This control signal activates and deactivates the shock damping device in one embodiment so as to switch it on and off. In this manner, when the rider pushes on the pedal with a high level of force, the consequent torque on the crank axle of the drive train causes the shock damping device to be deactivated converting the frame to a rigid frame which will not bob. When the driver lessens the torque, the damping device is reactivated and functions to absorb road shocks. In another embodiment of the invention, the control signal can be employed to moderate the degree to which the shock damping device functions. In this manner, the shock damping device can be completely locked out when high levels of torque are imposed on the drive train, as for example when pedaling uphill or under extreme acceleration. Moderate levels of damping are allowed when more moderate pedaling efforts are undertaken. In this manner, the degree of damping is tailored directly to the need therefor.

Figure 1:
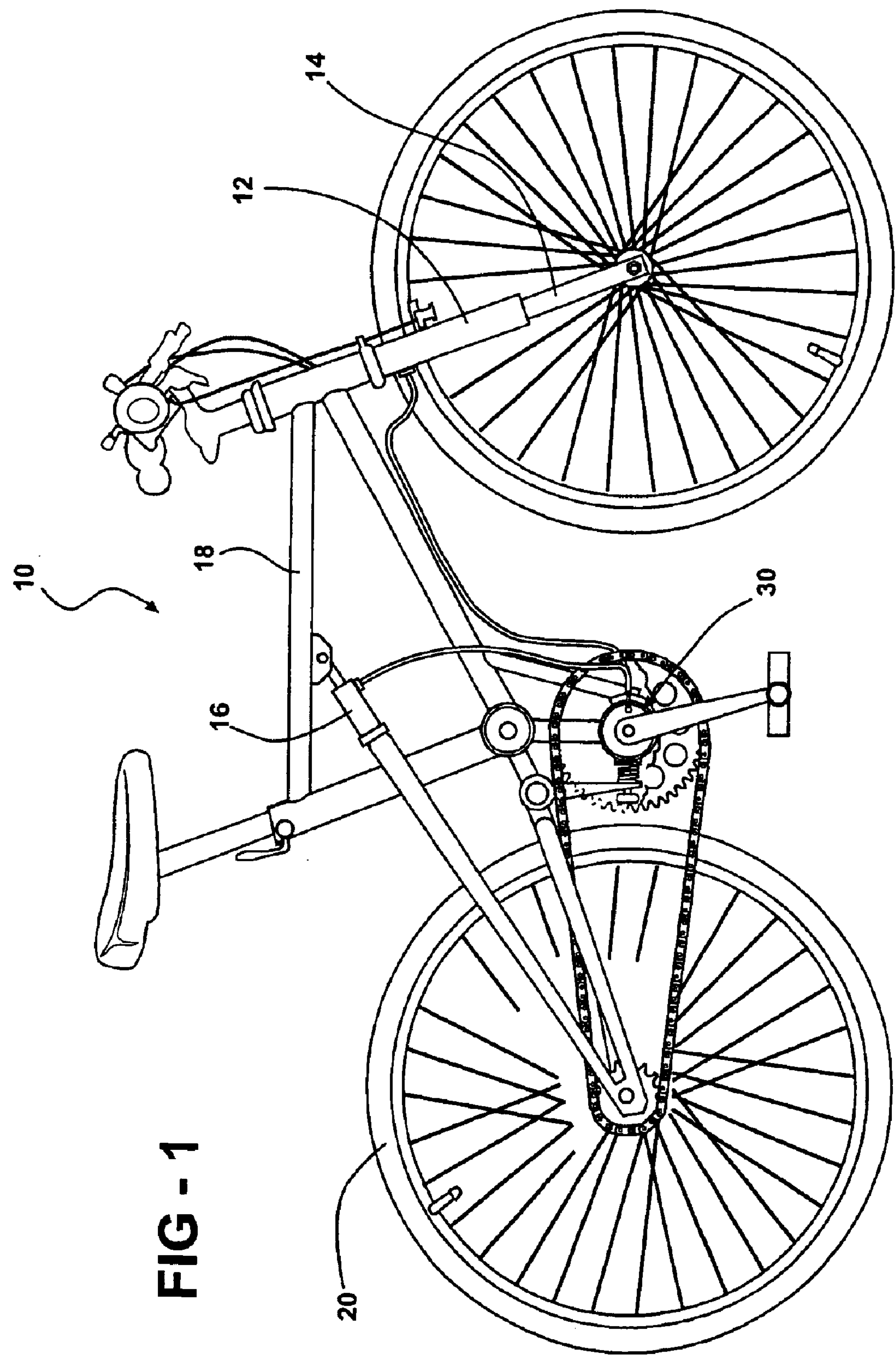
FIG. 1 is a side elevational view of a cycle incorporating one embodiment of anti-bob system of the present invention.

Referring now to FIG. 1, there is shown one embodiment of anti-bob system of the present invention as disposed and functional to control shock damping devices associated with a mountain bike. Specifically shown in FIG. 1 is a bicycle 10 having a first shock damping device 12 associated with the front fork 14 thereof and a second shock damping device 16 associated with the crossbar 18 and rear wheel assembly 20 thereof. The shocking damping devices 12, 16 are selectively actuatable devices, and a number of embodiments of such devices operating on hydraulic, electronic and ferrofluidic principles are well known in the art. The shock damping devices 12 and 16 are controlled by the anti-bob system of the present invention. As shown in FIG. 1, the anti-bob system 30 is associated with the crank set of the bicycle 10, and FIG. 2 provides an enlarged and more detailed depiction thereof.

Figure 2:
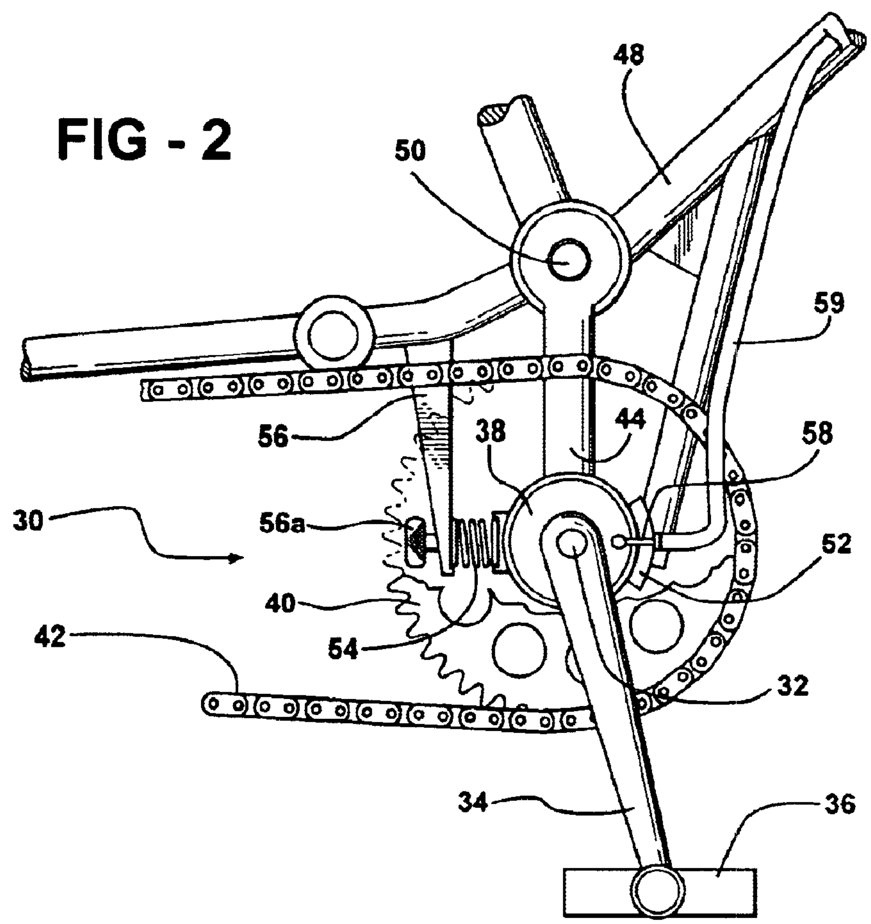
FIG. 2 is an enlarged view of a portion of the cycle of FIG. 1 better illustrating the crank axle torque detector and control signal generator thereof.

Referring now to FIG. 2, there is shown an enlarged depiction of the anti-bob system 30 discussed with reference to FIG. 1. The anti-bob system operates, as is described above, to sense the level of torque applied to a crank axle 32 when the crank arm 34 of the cycle is subjected to a force imposed on an associated pedal 36. In the FIG. 2 embodiment, the crank axle 32 is supported in a bearing assembly 38 so as to be rotatable therein. Rotation of the crank axle 32 rotates an associated chain ring 40 (shown partly cut away) which in turn rotates a drive chain 42 to propel the cycle. In this embodiment, the bearing assembly 38 is supported by a swing arm 44 which is pivotally supported upon the frame 48 of the cycle by a pivot joint 50.

The swing arm 44 and associated bearing assembly 38 are capable of pivoting back and forth in a first and second direction relative to the frame 48, and in this embodiment forward travel of the bearing assembly 38 is limited by a stop member 52 which is rigidly supported by the frame 48. Rearward travel of the bearing assembly 38 is controlled by a biasing spring 54 which is supported by a support arm 56 which is also rigidly retained by the frame 48. The biasing spring 54 urges the bearing assembly 38 in a forward direction until it is stopped by the stop block 52. The degree of biasing force may be adjusted in this embodiment by an adjustment screw 56*a*.

When torque is applied to the crank axle 32 in a clockwise direction with regard to the depiction of FIG. 2, a component of this torque urges the bearing assembly 38 and swing arm 44 in a rearward direction so as to overcome some degree of the biasing force exerted by the spring 54. If the torque is of a sufficient level to overcome a threshold level of biasing force, the swing arm 44 and associated crank assembly 38 will move, to a small degree, in the rearward direction. This motion corresponds to the amount of torque applied to the crank axle 52, and generates a control signal which is employed to control one or more shock absorbing devices associated with the cycle. In the FIG. 2 embodiment, a control cable 56 assembly, which is a push-pull cable, is supported by the stop block 52 and frame 48 of the cycle. The movable portion 58 of the cable assembly is affixed to the bearing assembly 38. When a sufficient level of torque is applied to the crank axle 32, motion of the bearing assembly in a rearward direction moves the movable portion 58 of the cable 59, and this motion constitutes a control signal which is communicated by the cable 56 to the shock damping device (not shown) of the cycle. As will be appreciated, the level of torque required to move the bearing assembly 38 and generate the control signal may be controlled by controlling the amount of tension of the biasing spring 54 via the tensioning screw 56.

While the FIG. 2 embodiment depicts the biasing device as being a spring 54, it is to be understood that yet other biasing devices may be similarly employed. For example, biasing may be accomplished by means of a body of rubber or other elastomeric material. Likewise, biasing may be accomplished by means of a pneumatic cylinder such as a gas-filled cylinder or the like. Also, while the control cable of the FIG. 2 embodiment has been described as being a push-pull cable, the control signal may be otherwise provided by the system. In some embodiments, motion of the bearing assembly 38 may be employed to change the pressure of a hydraulic fluid thereby producing a displacement which can control a shock damping device. For example, displacement of the bearing assembly can move a piston or compress a flexible member so as to displace a hydraulic fluid.

In addition to the use of mechanical signals and systems for providing control signals, electrical devices and systems may be similarly employed. For example, displacement of the bearing assembly can open and close an electrical switch so as to provide a control signal. Alternatively, the motion can be employed to activate a piezoelectric device to provide a control signal. Alternatively, the motion of the bearing assembly can be utilized to change the electrical resistivity of a pressure or displacement responsive resistive device. As will be apparent to one of skill in the art, hybrid mechanical and electrical systems may be employed in a similar manner to effectuate control of the damping devices. For example, motion of the components of the assembly can be utilized to move a potentiometer or other such resistive device to provide the control signal. Other such systems employing capacitive devices, magnetic devices and the like will also be apparent to those of skill in the art.

It should also be noted that while the control cable elements 56 and 58 are shown as being associated with the bearing assembly 38, these elements could alternatively be coupled to the swing arm 44. Also, motion in or about the pivot joint 50 may be utilized to provide the control signal through appropriate mechanical or electrical devices. The FIG. 2 embodiment (as well as the FIG. 4 embodiment discussed below) employs a pivotally supported swing arm 44 to support the bearing assembly 38; however, this arm may comprise a flexible member such as a spring steel, polymeric, or composite member which is rigidly fixed to the frame 48 at a first end, and which has the bearing assembly 38 supported at its free end. In such embodiments, the inherent flexibility of this resilient arm can also provide all or a portion of the biasing force which is provided by the spring 54 in the FIG. 2 embodiment. All of such embodiments are within the scope of the present invention.

Figure 3:
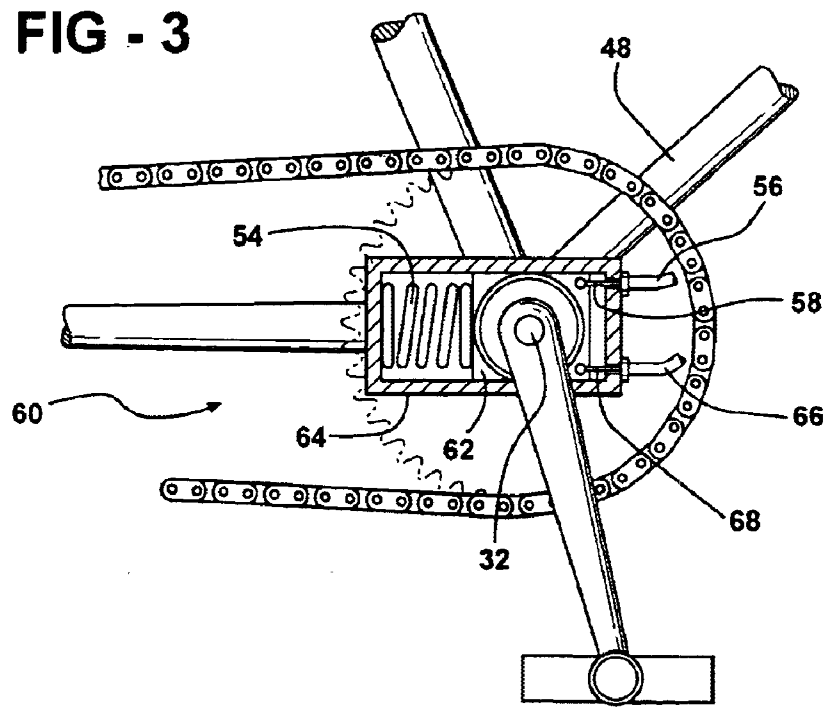
FIG. 3 is a side elevational view of a portion of a cycle generally similar to that shown in FIG. 1, but including another embodiment of crank axle torque detector and signal generator.

Referring now to FIG. 3, there is shown another embodiment of the present invention. FIG. 3 shows a control system 60 wherein a crank axle 32 is supported by a bearing assembly 62 which in turn is slidably supported upon the bicycle frame 48 by a housing 64 which allows the bearing assembly 62 to slide in a forward and backward direction as changing levels of torque are applied to the crank axle 32. As in the FIG. 2 embodiment, a biasing spring 54 urges the bearing assembly 62 in a forward direction. Although not illustrated, the spring 54 may have associated therewith an adjustment member. As is further shown in FIG. 3, a first 56 and a second 66 control cable assembly are associated with the control system 60. As in the FIG. 2 embodiment, motion of the bearing assembly 62 is conveyed to the movable portions 58, 68 of the control cables. As in the FIG. 2 embodiment, motion of the movable portions 58, 68 of the cable assemblies 56, 66 may be employed to control the activation and deactivation of shock damping devices.

As in the previous embodiment, other mechanical control systems, electrical control systems and hybrid systems may be similarly employed to generate and utilize control signals. For example, a pressure sensor, such as a piezoelectric sensor, hydraulic sensor or resistive sensor may be disposed in the housing 64, so as to sense the rearward motion of the bearing assembly 62. In that regard, the sensor may be associated with the spring 54, or it may replace it. While the FIG. 3 illustration may appear to imply that significant travel of the bearing assembly 62 is necessary to produce the control signal, this is not always the case. In those instances where a pressure sensor is employed, very small degrees of motion will suffice to generate a practical control signal.

Figure 4:
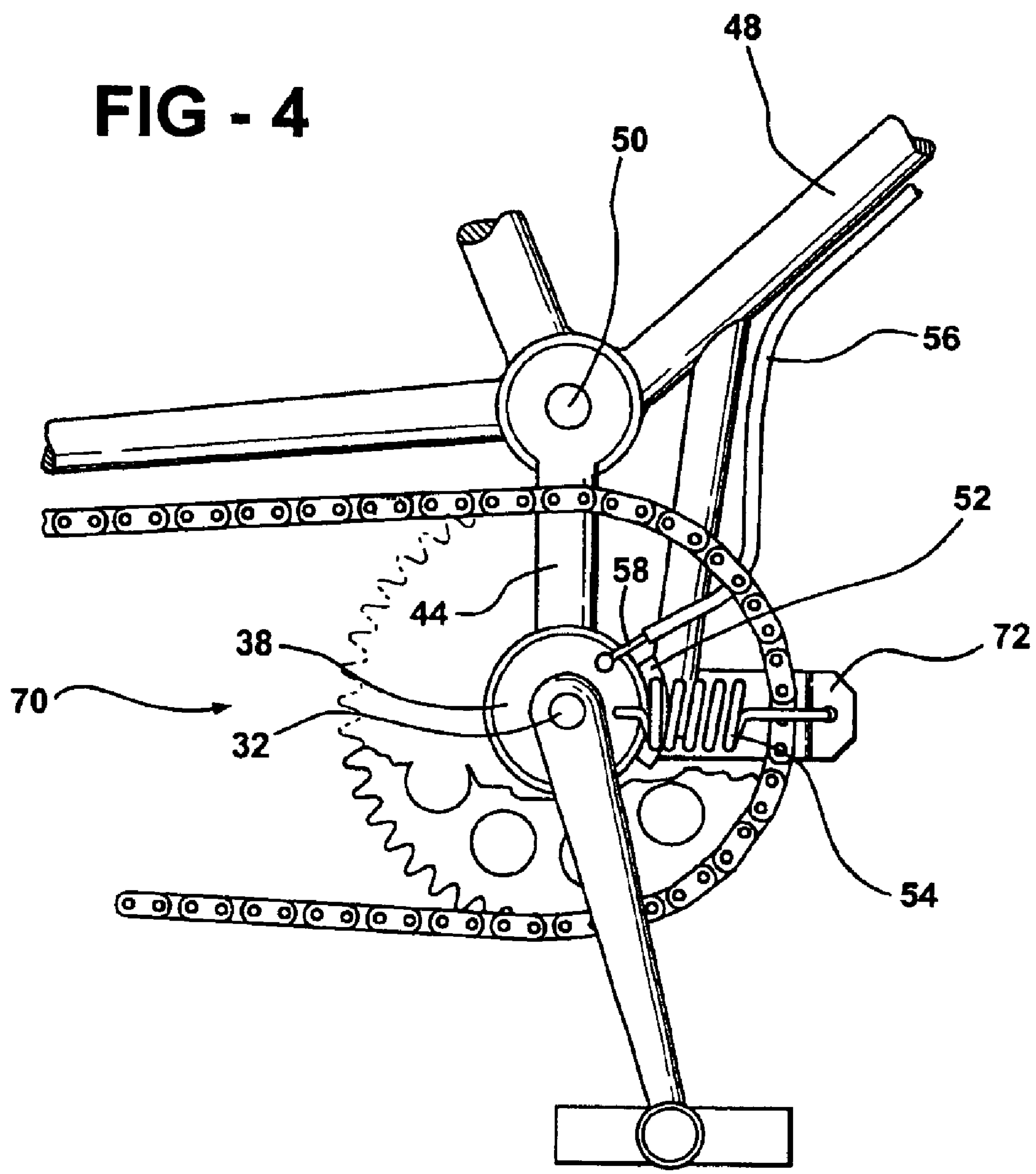
FIG. 4 is a side elevational view of a portion of a cycle illustrating yet another embodiment of the present invention.

Referring now to FIG. 4, there is shown yet another embodiment of control system 70 structured in accord with the principles of the present invention. The system 70 of FIG. 4 is generally similar to the system 30 of FIG. 2 insofar as it includes a swing arm 44 pivotally mounted to a bicycle frame 48 by a pivotal connection 50. The FIG. 4 embodiment further includes a bearing assembly 38 which is supported by the swing arm 44 so as to be movable in a forward and rearward direction. In the FIG. 4 embodiment, a biasing spring is disposed forward of the bearing assembly. The spring 54 is disposed so as to pull the bearing assembly into contact with a stop block 52 which is also forward of the bearing assembly. The level of tension in the biasing spring 54 may be adjusted by means of an adjustment screw (not shown); alternatively, the level of tension may be adjusted by selectably lengthening the support arm 72 which retains the spring 54 on the frame 48.

The FIG. 4 embodiment includes a control cable assembly 56 which functions in a manner similar to that shown in FIG. 2. In the operation of the FIG. 4 embodiment, a torque which is imposed upon the crank axle 32 operates to urge the bearing assembly and swing arm 44 in a rearward direction against the biasing force of the spring 54. As in the previous embodiments, when this level of torque exceeds a preselected level of biasing force, motion of the swing arm 44 and bearing assembly 38 occurs, and this motion can be employed to generate a control signal. As in the foregoing embodiments, the control signal may be generated by mechanical, electrical or hybrid mechanical electrical assemblies.

Figure 5:
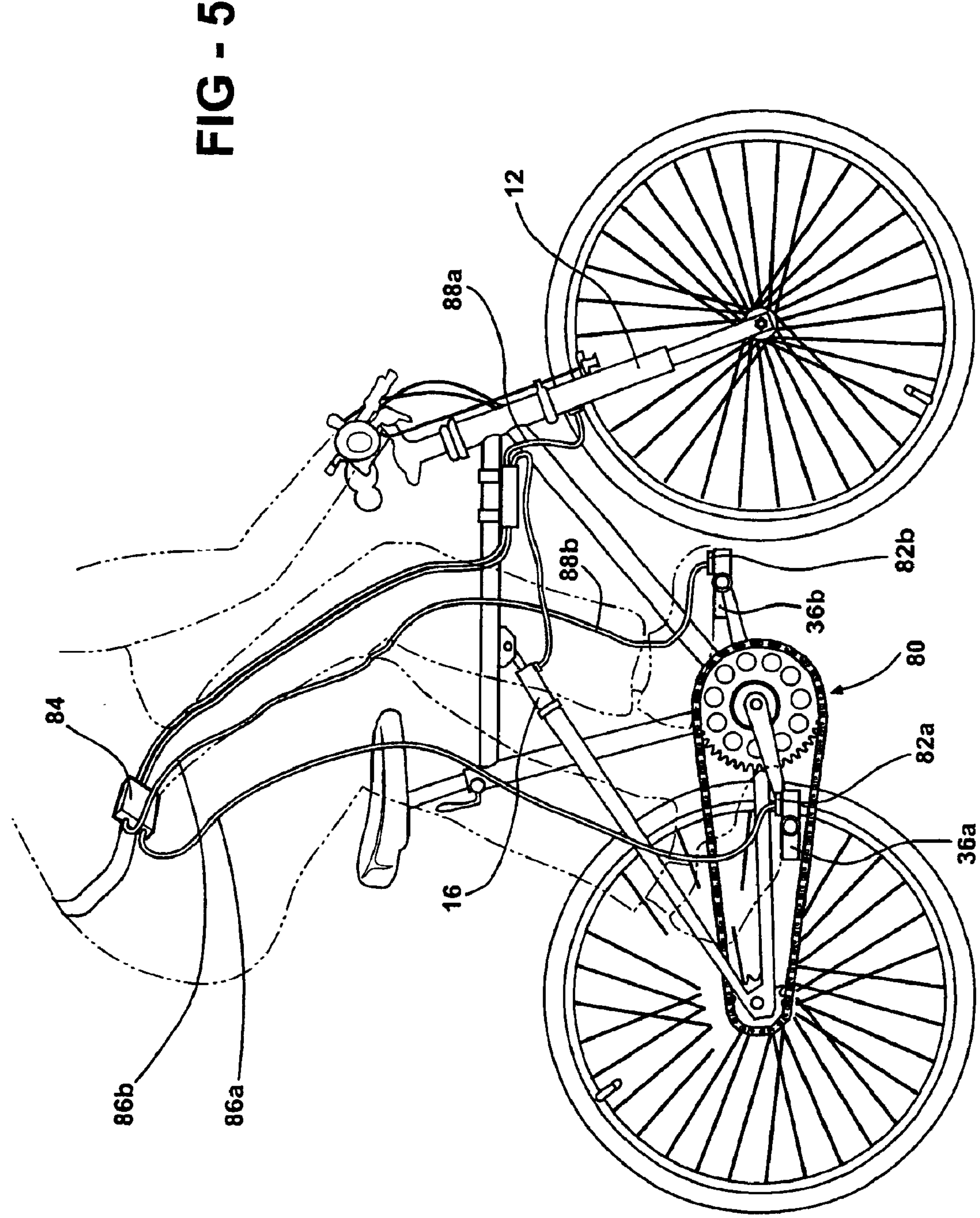
FIG. 5 is a side elevational view of a cycle incorporating yet another embodiment of anti-bob system of the present invention.

While FIGS. 1–4 all show control systems in which displacement of one or more portions of the crank set structure is employed to generate a control signal, yet other embodiments of the invention may be implemented. Drive torque applied to the crank axle will be proportional to the force which a rider applies to the pedals of a cycle, and this force may be detected and utilized to generate a control signal. Referring now to FIG. 5, there is shown yet another system 80 for selectably controlling the activation of shock damping devices 12, 16 of a bicycle. The system 80 of FIG. 5 employs one or more pressure sensors **82*a*, 82*b* which are disposed so as to sense the level of pressure applied to a pedal 36*a*, 36*b* of the bicycle. The pressure sensors 82*a*, 82*b* may be mounted on the faces of the pedals 36*a*, 36*b*, or they may be mounted on the shoes of the cyclist. The pressure sensors 82*a*, 82*b* may constitute piezoelectric sensors, resistive sensors or the like. As is known in the art, these sensors generate an electrical signal in response to the degree of pressure applied thereto. In the FIG. 5 embodiment, signals generated by the pressure sensors 82*a*, 82*b* are communicated to a controller 84 by means of control lines 86*a*, 86*b*. As illustrated in FIG. 5, the controller 84 is mounted on a belt worn by the cyclist; however, the controller 84 may likewise be mounted on some portion of the bicycle. The controller receives the pressure generated signals from the pressure sensors 82*a*, 82*b* and generates a control signal in response thereto. This control signal is communicated to the shock damping devices 12 and 16 by control lines 88*a*, 88*b***.

While the system of FIG. 5 may be implemented with one pressure sensor and one signal line, the system most preferably operates with two pressure sensors. By using two sensors, the controller 84 is capable of distinguishing between a force which is simultaneously applied to both pedals, as for example when a cyclist is standing on the pedals, and a force which is applied to only one pedal. The controller 84 may include relatively simple logic circuitry which will enable it to generate control signals for activating and deactivating the shock damping devices 12, 16. The controller 84 may operate to activate the shock damping devices 12, 16 in a simple on-off mode, or it may sense the level of force applied to the pedals and control the shock damping devices in proportion thereto. The FIG. 5 embodiment can also be implemented with a purely mechanical system wherein compression of a hydraulic fluid generates a control signal which activates the shock damping devices. Likewise, the FIG. 5 embodiment can employ the displacement of a spring or the like to provide the control signal.

While the control system of the present invention has been described as providing an on/off response to torque on the crank axle, the invention may be further operative to provide a higher degree of control of a bicycle's suspension under particular circumstances. For example, when a rider is pedaling up a hill in low gear, he or she may induce a number of high torque impulses on the crank axle within a relatively short duration of time. This can cause the suspension to lock and unlock at a corresponding rate, and this may be unacceptable to the cyclist. In order to avoid this problem, the system of the present invention may be made operative to average out the effect of these torque peaks. For example, the system can be made operative to keep the suspension in a rigid mode if, for example, ten to fifteen high torque impulses are detected within a five second time period. This averaging out or damping can be accomplished utilizing electrical, mechanical, electromechanical, electronic or hydraulic means. In one approach, a hydraulic control device may be associated with the shock dampers. This device will operate to provide a short lag time before allowing a rigidified damping device to return to its open state. Building in this lag will effectively prevent the rapid locking and unlocking of the damping device under situations in which rapid, repetitive high torque levels are sensed. This damping may likewise be accomplished by equivalent mechanical devices or by electronic or electromechanical devices. Such damping may also be accomplished by devices associated with the torque detector linkages themselves. For example, mechanical and/or hydraulic damping devices may be imposed in the systems shown in detail in FIGS. 2 and 3 so as to control the return, forward, motion of the crank assembly. Electronic control systems may likewise be employed to provide for torque damping. As described hereinabove, various embodiments of the present invention will include a programmed logic control device such as a microchip which receives an input relating to measured torque and provides for control of the damping devices. This controller may be programmed to respond accordingly to particular profiles of rapid, repetitive torque, and to control the damping devices accordingly. All of these control systems may be made adjustable to accommodate riding conditions as well as the rider's size, weight and pedaling style. In some embodiments, the system may be configured to allow for the rider to select a control program corresponding to a touring or a racing mode. In other instances, the system may be made speed responsive so that a control program will be implemented to accommodate for a faster low rate of travel. For example, when a rider is climbing a hill at a relatively slow speed, a very high degree of torque peak damping may be desired, while a much lower degree will be sufficient at high speeds. Also, the system may be made adjustable so as to provide for different degrees of control of damping on front and rear suspension systems. All of such embodiments are within the scope of the present invention and will be readily apparent to one of skill in the art in view of the teachings presented herein.

Yet other embodiments of the present invention may be implemented in view of the teaching presented herein. For example, the torque on the crank axle may be measured by measuring the force applied to the crank arms. Such measurement may be accomplished by means of a strain gauge which can be affixed to, or integral with, the crank arms. It should also be kept in mind that while in the FIGS. 1–4 embodiments, the various components of the system such as the swing arm, support housing and bearing assembly are described as moving, it is well within the skill of the art to detect microscopic or nascent levels of motion by means of strain gauges, piezoelectric devices, resistive devices and magnetic devices; hence, systems which operate in this manner are also within the scope of the present invention. Yet other embodiments will be apparent to those of skill in the art in view of the teaching presented herein.

The foregoing drawings, discussion and description are illustrative of particular embodiments of the present invention and are not meant to be limitations upon the practice thereof. It is the following claims, including all equivalents, which define the scope of the invention.

What is claimed is:

1. An anti-bob system operable to control a shock damping device of a cycle, said system including:

a crank axle torque detector operable to detect a level of torque applied to a crank axle, and to provide a control signal corresponding to said level of torque, said control signal being a mechanical signal comprising the displacement of a control cable; and a shock damping device coupled to a frame of said cycle, said shock damping device functioning to absorb and dampen mechanical shocks communicated to said frame, said shock damping device including an activator for controlling the damping function thereof, said activator being operable to receive the control signal from said crank axle torque detector and to control the shock damping device in response thereto; whereby said shock damping device is controlled in response to the level of torque applied to said crank axle.

2. The system of claim 1, wherein said torque detector includes:

a swing arm pivotally suspended from said frame, said swing arm having said crank axle rotatably supported thereupon;

a biasing member disposed so as to impose a biasing force on said swing arm so as to urge the swing arm in a first direction relative to said frame; whereby when a torque is applied to the crank axle the torque operates to counter at least a portion of the biasing force so as to displace the swing arm in a second direction different from said first direction; whereby said displacement comprises said control signal; and wherein said control cable is in mechanical communication with the swing arm and with the activator of said shock damping device so that said displacement of the swing arm is communicated to said activator by the corresponding displacement of said control cable.

3. The system of claim 2, wherein said biasing member is a spring.

4. The system of claim 2, wherein said torque detector further includes a stop member disposed so as to limit the motion of said swing arm in said first direction.

5. The system of claim 2, wherein the biasing member is adjustable so that the biasing force imposed on said swing arm may be varied.

6. The system of claim 1, wherein said activator is operable to switch the shock damping device from an on state in which it functions to dampen mechanical shocks communicated to said frame, to an off state in which it does not dampen mechanical shocks communicated to said frame.

7. The system of claim 1, wherein said activator is operable to control the shock damping device so as to vary the degree to which said shock damping device functions to dampen mechanical shocks communicated to said frame.

8. The system of claim 1, wherein said crank axle torque detector is operable to detect a periodically varying level of torque and to provide a control signal corresponding to said periodically varying level.

9. The system of claim 8, wherein said control signal corresponds to the peak value of said periodically varying level.

10. The system of claim 8, wherein said control signal corresponds to an average value of said periodically varying level.

11. An anti-bob system operable to control a shock damping device of a cycle, said system including:

a crank axle torque detector operable to detect a level of torque applied to a crank axle, and to provide a control signal corresponding to said level of torque, said control signal comprising an electrical signal; and a shock damping device coupled to a frame of said cycle, said shock damping device functioning to absorb and dampen mechanical shocks communicated to said frame, said shock damping device including an activator for controlling the damping function thereof, said activator being operable to receive the control signal from said crank axle torque detector and to control the shock damping device in response thereto; whereby said shock damping device is controlled in response to the level of torque applied to said crank axle.

12. The system of claim 11, wherein said torque detector includes:

a swing arm pivotally suspended from said frame, said swing arm having said crank axle rotatably supported thereupon; and a biasing member disposed so as to impose a biasing force on said swing arm so as to urge the swing arm in a first direction relative to said frame; whereby when a torque is applied to the crank axle the torque operates to counter at least a portion of the biasing force so as to displace the swing arm in a second direction different from said first direction; whereby said displacement comprises said control signal.

13. The system of claim 12, wherein said system further includes an electrical transducer which is in mechanical communication with said swing arm and in electrical communication with the activator of said shock damping device, said transducer being operable to convert the displacement of said swing arm into an electrical control signal and to convey that signal to said actuator.

14. The system of claim 13, wherein said electrical transducer is a piezoelectric transducer.

15. The system of claim 13, wherein said transducer is operable to change its electrical resistance in response to the displacement of said swing arm.

16. An anti-bob system operable to control a shock damping device of a cycle, said system including:

a crank axle torque detector operable to detect a level of torque applied to a crank axle, and to provide a control signal corresponding to said level of torque, said torque detector comprising a positionally displaceable bearing assembly supported upon said frame, said bearing assembly having said crank axle rotatably supported thereupon; and a biasing member disposed so as to impose a biasing force on said bearing assembly so as to urge said bearing assembly in a first direction relative to said frame; whereby when a torque is applied to the crank axle, the torque operates to counter at least a portion of the biasing force so as to displace the bearing assembly in a second direction different from said first direction, whereby said displacement comprises said control signal; and a shock damping device coupled to a frame of said cycle, said shock damping device functioning to absorb and dampen mechanical shocks communicated to said frame, said shock damping device including an activator for controlling the damping function thereof, said activator being operable to receive the control signal from said crank axle torque detector and to control the shock damping device in response thereto; whereby said shock damping device is controlled in response to the level of torque applied to said crank axle.

17. The system of claim 16, wherein said bearing assembly is supported upon said frame by a swing arm which is pivotally attached to said frame.

18. The system of claim 16, wherein said bearing assembly is supported upon said frame by a housing which allows the bearing assembly to slide in said first direction and said second direction.

19. The system of claim 18, wherein said biasing member is disposed within said housing.

20. An anti-bob system operable to control a shock damping device of a cycle which includes a pedal connected to a crank axle by a crank arm, said system including:

a crank axle torque detector comprising a pressure-responsive device interposed between the pedal and a foot of a user who is operating the cycle, said torque detector being operable to detect a level of torque applied to a crank axle, and to provide a control signal corresponding to said level of torque; and a shock damping device coupled to a frame of said cycle, said shock damping device functioning to absorb and dampen mechanical shocks communicated to said frame, said shock damping device including an activator for controlling the damping function thereof, said activator being operable to receive the control signal from said crank axle torque detector and to control the shock damping device in response thereto; whereby said shock damping device is controlled in response to the level of torque applied to said crank axle.

21. The system of claim 20, wherein said pressure responsive device is affixed to a shoe disposed upon said user's foot.

22. The system of claim 20, wherein said pressure responsive device is affixed to said pedal.

23. An anti-bob system operable to control a shock damping device of a cycle, said system including:

a crank axle torque detector operable to detect a periodically varying level of torque applied to a crank axle, and to provide a control signal corresponding to said periodically varying level of torque; and a shock damping device coupled to a frame of said cycle, said shock damping device functioning to absorb and dampen mechanical shocks communicated to said frame, said shock damping device including an activator for controlling the damping function thereof, said activator being operable to receive the control signal from said crank axle torque detector and to control the shock damping device in response thereto; whereby said shock damping device is controlled in response to the level of torque applied to said crank axle.

24. The system of claim 23, wherein said control signal corresponds to the peak value of said periodically varying level.

25. The system of claim 23, wherein said control signal corresponds to an average value of said periodically varying level.

26. An anti-bob system operable to control a shock damping device of a cycle, said system including:

a crank axle torque detector operable to detect a level of torque applied to a crank axle, and to provide a control signal corresponding to said level of torque; and a shock damping device coupled to a frame of said cycle, said shock damping device functioning to absorb and dampen mechanical shocks communicated to said frame from a surface on which said cycle is traveling, said shock damping device including an activator for controlling the damping function thereof, said activator being operable to receive the control signal from said crank axle torque detector and to control the shock damping device in response thereto; whereby said shock damping device is controlled in response to the level of torque applied to said crank axle.

* * * * *